(12) United States Patent
Wong et al.

(10) Patent No.: US 11,717,793 B2
(45) Date of Patent: Aug. 8, 2023

(54) FUNCTIONAL FIBROUS MEMBRANE, METHOD FOR MANUFACTURING THE SAME, FILTER COMPRISING THE SAME

(71) Applicant: KING'S FLAIR DEVELOPMENT LTD., Hong Kong (CN)

(72) Inventors: Siu Wah Wong, Hong Kong (CN); Ho Wang Tong, Shatin (CN); Yu-Jen Chiang, Shatin (CN); Chun Yin Karl Yip, Shatin (CN); Arthur Hong-kin Kwong, Shatin (CN); Huajia Diao, Shatin (CN); Yinghua Zhang, Shatin (CN); Yu Hang Leung, Shatin (CN); Connie Sau Kuen Kwok, Shatin (CN)

(73) Assignee: KING'S FLAIR DEVELOPMENT LTD., Hong Kong (CN)

( * ) Notice: Subject to any disclaimer, the term of this patent is extended or adjusted under 35 U.S.C. 154(b) by 53 days.

(21) Appl. No.: 16/978,515

(22) PCT Filed: Mar. 7, 2019

(86) PCT No.: PCT/IB2019/051837
§ 371 (c)(1),
(2) Date: Sep. 4, 2020

(87) PCT Pub. No.: WO2019/171311
PCT Pub. Date: Sep. 12, 2019

(65) Prior Publication Data
US 2020/0398230 A1    Dec. 24, 2020

Related U.S. Application Data

(60) Provisional application No. 62/639,605, filed on Mar. 7, 2018.

(51) Int. Cl.
*B01D 71/82* (2006.01)
*B01D 63/06* (2006.01)
(Continued)

(52) U.S. Cl.
CPC .......... *B01D 71/82* (2013.01); *B01D 63/067* (2013.01); *B01D 67/002* (2013.01);
(Continued)

(58) Field of Classification Search
CPC .. B01D 71/82; B01D 63/067; B01D 67/0004; B01D 67/002; B01D 67/0093;
(Continued)

(56) References Cited

U.S. PATENT DOCUMENTS

2013/0112618 A1   5/2013   Diallo et al.
2017/0361254 A1*  12/2017  Huang ................... D01D 10/00

FOREIGN PATENT DOCUMENTS

CN        101879466 A       11/2010
CN        101905122 A       12/2010
(Continued)

OTHER PUBLICATIONS

International Searching Authority, "Search Report and Written Opinion," issued in connection with International Patent Application No. PCT/IB2019/051837, dated Sep. 12, 2019, 9 pages.

*Primary Examiner* — Krishnan S Menon
(74) *Attorney, Agent, or Firm* — Nyemaster Goode P.C.

(57) ABSTRACT

A novel fibrous membrane comprises at least one substrate layer comprising at least 80% by weight of microfibers that carry positively charged and/or negatively charged functional groups, and at least one layer of filtration material attached to the substrate layer, wherein the layer of filtration material comprises at least 80% by weight of nanofibers that carry negatively charged and/or positively charged functional groups. The fibrous membrane is able to remove or reduce the concentration of bacteria, viruses and heavy metals while maintaining relatively high water flow. A filter comprising the fibrous membrane and a method for manufacturing the fibrous membrane are also provided.

24 Claims, 3 Drawing Sheets

(51) Int. Cl.
  *B01D 67/00* (2006.01)
  *B01D 69/02* (2006.01)
  *B01D 69/12* (2006.01)
  *B01D 71/40* (2006.01)

(52) U.S. Cl.
  CPC ..... *B01D 67/0004* (2013.01); *B01D 67/0093* (2013.01); *B01D 69/02* (2013.01); *B01D 69/12* (2013.01); *B01D 71/40* (2013.01); *B01D 2313/40* (2013.01); *B01D 2313/44* (2013.01); *B01D 2323/36* (2013.01); *B01D 2323/39* (2013.01); *B01D 2325/022* (2013.01); *B01D 2325/14* (2013.01); *B01D 2325/16* (2013.01)

(58) Field of Classification Search
  CPC ........ B01D 69/02; B01D 69/12; B01D 71/40; B01D 2323/36; B01D 2323/39; B01D 2325/022; B01D 2325/14; B01D 2325/16; B01D 69/06; B01D 2325/18; B01D 71/42; B01D 24/105; B01D 29/21; B01D 61/147; C02F 1/283; C02F 1/42; C02F 1/44; C02F 2101/20; C02F 2201/003; C02F 2201/006; C02F 2303/04; C02F 2307/02; C02F 2307/04; C02F 1/003
  See application file for complete search history.

(56) References Cited

FOREIGN PATENT DOCUMENTS

| CN | 103272491 A | 9/2013 |
|---|---|---|
| CN | 104649371 A | 5/2015 |
| CN | 107081077 A | 8/2017 |
| WO | 0140448 A1 | 6/2001 |

\* cited by examiner

FUNCTIONAL FIBROUS MEMBRANE, METHOD FOR MANUFACTURING THE SAME, FILTER COMPRISING THE SAME

CROSS-REFERENCE OF RELATED APPLICATION

This application claims benefit of U.S. Provisional Application having Ser. No. 62/639,605 filed on 7 Mar. 2018, which is hereby incorporated by reference herein in its entirety.

FIELD OF THE INVENTION

This invention relates to a functional fibrous membrane comprising one or more substrate layer and one or more filtration material layer attached to the substrate layer. The substrate layer comprises primarily microfibers that carry positively charged and/or negatively charged functional groups; and the filtration material layer comprises primarily nanofibers that carry positively charged and/or negatively charged functional groups. The functional fibrous membrane can be used to remove or reduce the concentration of bacteria, viruses and heavy metals while maintaining relatively high water flow of a water filtration system.

BACKGROUND OF THE INVENTION

Water treatment is the process of improving the quality of water by removing or reducing the concentration of undesirable chemicals, heavy metals, biological contaminants, suspensions and gases from water. Typical water treatment techniques include chemical coagulation and flocculation, adsorption, ion exchange, size exclusion and membrane filtration etc.

Chemical coagulation and flocculation are essential pretreatment methods for many water treatment systems, but there are two major limitations. Firstly, chemical disinfectants can break down into carcinogenic by-products when in contact with natural organic matters (NOM). Secondly, most systems for chemical coagulation and flocculation suffer from high capital and operating costs.

Adsorption, ion exchange, size exclusion, membrane filtration, or their combination is usually employed when a small scale filter is used for purifying water from a bottle, pitcher, faucet or the like.

Water purification by adsorption or ion exchange using a packed bed of porous resin beads usually provides excellent purification factors. Unfortunately, this technique also suffers from several major limitations. The operational flow rates must be very low under acceptable pressure limits. In order to achieve high binding levels of the target contaminants in terms of bound contaminants per volume of resin, very long residence times are required, which again necessitates slow flow rates and/or cumbersome packing arrangements. These capacity limitations are primarily due to the very slow intra-particle diffusion of the relatively large contaminants to access available binding sites deep within the porous resin beads. To date, a high flux water filter capable of offering comprehensive filtration can be hardly found in the art, thereby requires unavoidable use of bulky and multiple modules for comprehensive filtration.

There has been no fibrous membrane in the prior art that enables the comprehensive removal of a wide range of undesirable particulates, chemicals, biological contaminants and other impurities from water while maintaining a high water flux in the filtration systems.

SUMMARY OF THE INVENTION

It has been discovered that nanofibers and microfibers can be functionalized to form a fibrous membrane that carry both the positive and/or negative charges, which has superior performance to the filter materials of the prior art.

An object of the invention is to provide a fibrous membrane which is able to provide a comprehensive filtration and can be used in a filtration system to improve water quality, and the filtration system includes portable and home filtration systems.

Another object of the present invention is to provide a method for producing the above fibrous membrane and a filter comprising the fibrous membrane used as a filter medium of the filter.

These and other objects and advantages of the invention are satisfied by providing a fibrous membrane comprising: at least one substrate layer comprising at least 80% by weight of microfibers that carry positively charged and/or negatively charged functional groups, and at least one layer of filtration material attached to the substrate layer, wherein the layer of filtration material comprises at least 80% by weight of nanofibers that carry negatively charged and/or positively charged functional groups.

In certain embodiments, the substrate layer may comprise at least 90% by weight of the microfibers that carry positively charged and/or negatively charged functional groups, or may consist of the microfibers that carry positively charged and/or negatively charged functional groups. In certain embodiments, the filtration material layer may comprise at least 90% by weight of the nanofibers that carry negatively charged and/or positively charged functional groups, or may consist of the nanofibers that carry negatively charged and/or positively charged functional groups.

In certain embodiments, the positively charged functional groups may be selected from the group consisting of quaternary ammonium, phosphonium, sulfonium, amidinium, guanidinium, pyridinium groups, and any combination thereof.

In certain embodiments, the negatively charged functional groups may be selected from the group consisting of carboxylate, phenol, phosphonate, phosphate, sulfonate, sulfate, sulfamate, nitrate, nitro groups and any combination thereof.

In certain embodiments, the negatively charged functional groups may be selected from ionisable polysulphonates, salts of poly(2-acrylamido-2-methyl-propane sulphonic acid) or its copolymers with acrylamides or alkyl methacrylates, sulphonated polystyrene, sulphonated polyepichlorohydrin, sulphonated poly(2,5-dimethylphenylene oxide), sulphonated polyphenylether sulphones (or ketones), and sulphonated polyethylene; polyvinylsulphonic acid sodium salt, polyacrylic acid, polymaleic acid, sulphonated EPDM; polycarboxylates, salts of polyacrylic acid and copolymers of acrylic acid; phosphonated polymers; and any mixture or any blend thereof.

Preferably, the positively charged and/or negatively charged functional groups of the substrate layer and the negatively charged and/or positively charged functional groups of the layer of filtration material are derived from amphions, preferably amine-based groups. In certain preferred embodiments, the functional groups are selected from phosphate, carboxylic and amino groups and other charged functional groups which are polar. Example of the other polar functional groups may be selected from hydroxyl, carbonyl or sulfhydryl groups.

In certain embodiments, the fibrous membrane may comprise alternately at least one substrate layer and at least one filtration material layer.

In certain embodiments, the fibrous membrane may comprise two or more substrate layers of different pore sizes which decrease in a direction from the substrate layers to the filtration material layers. In certain embodiments, the fibrous membrane may comprise two or more filtration material layers of different pore sizes which decrease in a direction from the substrate layers to the filtration material layers.

In certain embodiments, the microfibers or the nanofibers are functionalized to carry the positively or negatively charged functional groups by one of the following:
  reacting a polymer having one or more amino functional groups with an alkylating agent,
  reacting a polymer having one or more amino or hydroxy groups with a quaternary ammonium compound having an epoxy or chlorohydrin group; and
  reacting a polymer having an abstractable hydrogen atom with diallyldimethylammonium chloride in the presence of a radical starter.

In a second aspect of the invention, there is provided a filter comprising the fibrous membrane of the invention used as a filter medium of the filter.

In certain embodiments, the filter may have a cylindrical configuration, and the fibrous membrane is also formed as a cylindrical structure. Preferably, the filter may further comprise a casing coaxially surrounding the cylindrical fibrous membrane in a spaced-apart fashion, and a further filtration material comprising porous resin beads and activated carbon particles which are arranged within a space defined by the cylindrical fibrous membrane.

In certain embodiments, the filter may have a cylindrical configuration and may further comprise a cylindrical casing and a further filtration material comprising porous resin beads and activated carbon particles. The fibrous membrane may be placed onto a bottom of the cylindrical casing, and the porous resin beads and activated carbon particles may be placed on the fibrous membrane.

In another aspect of the invention, a method for manufacturing the functional microfibers and/or nanofibers used to fabricate the fibrous membrane is provided, comprising the steps of:
  (i) providing amine-based polymer microfibers and/or nanofibers,
  (ii) reacting the amine-based polymer microfibers and/or nanofibers with an alkylating agent or a quaternary ammonium compound under such a condition that a first portion of the amine-based polymer is converted into a first compound having carboxyl groups, and a second portion of the amine-based polymer is reacted with the alkylating agent or with the quaternary ammonium compound to give a second compound having amino groups, so that the microfibers and/or nanofibers are functionalized to carry negatively charged and/or positively charged functional groups.

In step (i), the amine-based polymer may be selected from polyacrylonitrile (PAN) or chitosan.

In step (ii), the alkylating agent may be selected from the group consisting of dimethylsulfate, diethylsulfate, dimethylcarbonate, methyl chloride, methyl bromide or benzyl chloride, and any combination thereof; and the quaternary ammonium compound may be selected from the group consisting of trimethyl-1-(2,3-epoxypropyl) ammonium chloride, trimethyl-1-(3-chloro-2-hydroxypropyl) ammonium chloride, glycidyltrimethylammonium chloride (GTMAC), and any combination thereof.

In one preferred embodiment of the invention, step (i) of providing the polymer microfibers or nanofibers comprise hydrolyzing polyacrylonitrile (PAN) under alkaline conditions into an amine intermediate. The amine intermediate is hydrolyzed under alkaline conditions in the presence of glycidyltrimethylammonium chloride (GTMAC) such that a first portion of amino groups are converted into carboxyl groups and a second portion of amino groups are quaternized with GTMAC, thereby to simultaneously give hydrolyzed PAN (H-PAN) having the carboxyl groups and quaternized amine-terminated PAN having the amino groups.

Advantageously, PAN and GTMAC may be provided in a ratio ranging from 1:4 to 1:3.

In step (i), the nanofibers may be prepared by electrospinning the polymer; and the microfibers may be prepared by spunbonding the polymer.

The method further comprises a step of attaching the functional nanofibers onto the microfibers to form a layered structure prior to step (ii).

DETAILED DESCRIPTION OF THE PREFERRED EMBODIMENTS

Figure 1:
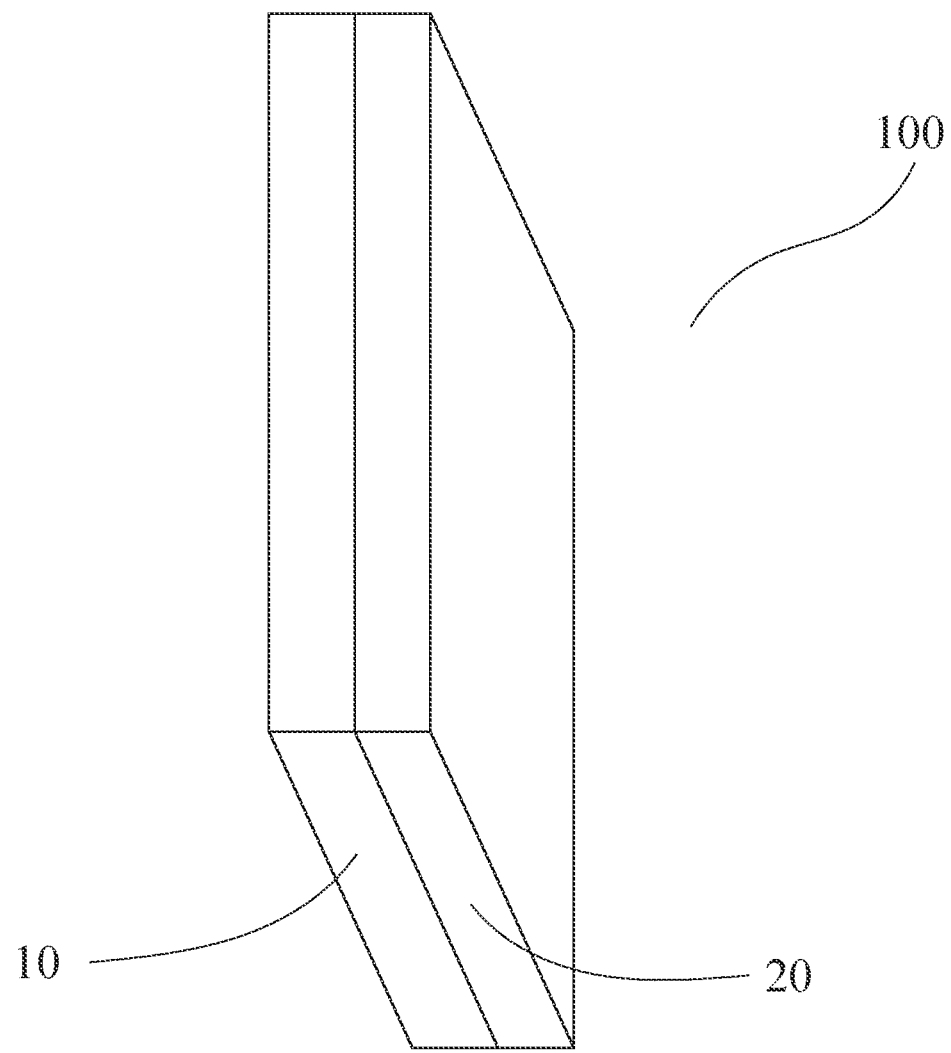
FIG. 1 is a perspective view of a fibrous membrane having a configuration of one substrate layer and one filtration material layer constructed in accordance with an embodiment of the invention.

The invention primarily relates to a fibrous membrane functionalized to carry both the positive and negative charges. As most bacteria and viruses are negatively charged and heavy metals are usually positively charged, the fibrous membrane of the invention, which carry both the positive and negative charges, are capable of removing or reducing various types of contaminants, including those hard-to-remove heavy metals, bacteria and viruses, from the water by size exclusion, adsorption and ion exchange.

Of the invention, the fibrous membrane may consist of a substrate layer comprising a plurality of microfibers that carry positively charged and/or negatively charged functional groups and a filtration material layer comprising a plurality of nanofibers that carry negatively charged and/or positively charged functional groups. It would be better that the substrate layer and the filtration material layer are fabricated such that they carry different charges from each other.

The fibrous membrane of the invention may comprise two or more substrate layers and two or more filtration material layers in an alternate way. One example of the multi-layered fibrous membrane is such that the filtration material layer is sandwiched between two substrate layers. Of course, the fibrous membrane of the invention may be configured to sandwich two or more filtration material layers between two substrate layers.

In certain cases, the fibrous membrane may comprise: (a) one or more substrate layers that carry positively charged functional groups, (b) one or more substrate layers that carry negatively charged functional groups, (c) one or more filtration material layers that carry positively charged functional groups, and (d) one or more filtration material layers that carry negatively charged functional groups.

In certain cases, the fibrous membrane may comprise: (a) a substrate layer that comprises a plurality of microfibers that carry both positively charged and negatively charged functional groups, and (b) a filtration material layer that comprises a plurality of nanofibers that carry both positively charged and negatively charged functional groups.

In certain cases, the fibrous membrane may comprise two or more substrate layers of different pore sizes. In certain cases, the fibrous membrane may comprise two or more filtration material layers of different pore sizes. In some cases, the functional fibrous membrane comprises two or more substrate layers of different pore sizes and two or more filtration material layers of different pore sizes.

It would be within the ability of a person skilled in the art that other layered configurations of the fibrous membrane are possible according to the actual needs and requirements.

The nanofibers may include fibers to have an average diameter in a range, for example, from 10 nm to 900 nm. Due to the small diameters and the high specific surface area, the nanofibers exhibit an excellent filtration performance. However the nanofibers are known to have a limitation of weak mechanical strength and cannot withstand the mechanical impact during the filtration process.

The microfibers used in the invention may have a diameter in a range, for example, from 2 μm to 50 μm. The microfibers of this invention are used as a substrate on which the nanofibers are deployed to provide the sufficient mechanical strength for the nanofibers.

According to the invention, the substrate layer may comprise a mixture of microfibers and nanofibers, wherein the microfibers account for at least 80%, preferably at least 90%, by weight based on the weight of the mixture. In one preferred embodiment of the invention, the substrate layer consists of the microfibers that carry positively charged and/or negatively charged functional groups.

The filtration material layer may comprise a mixture of microfibers and nanofibers, wherein the nanofibers account for at least 80%, preferably at least 90%, by weight based on the weight of the mixture. In one preferred embodiment of the invention, the filtration material layer consists of the nanofibers that carry positively charged and/or negatively charged functional groups.

The positively charged functional groups include, but not limited to, quaternary ammonium, phosphonium, sulfonium, amidinium, guanidinium and pyridinium, particularly preferred quaternary ammonium groups. As an alternative, the positively charged functional groups are functional groups with a permanent positive charge independent of the pH value of a polymer solution that is used to fabricate the microfibers or the nanofibers The negatively charged functional groups include, but not limited to, carboxylate, phenol, phosphonate, phosphate, sulfonate, sulfate, sulfamate, nitrate and nitro groups. Examples of the negatively charged functional groups include ionisable polysulphonates such as salts of poly(2-acrylamido-2-methyl-propane sulphonic acid) or its copolymers with acrylamides or alkyl methacrylates, sulphonated polystyrene, sulphonated polyepichlorohydrin, sulphonated poly(2,5-dimethylphenylene oxide), sulphonated polyphenylether sulphones (or ketones), and sulphonated polyethylene; polyvinylsulphonic acid sodium salt, polyacrylic acid, polymaleic acid, sulphonated EPDM; polycarboxylates such as salts of polyacrylic acid and copolymers of acrylic acid; phosphonated polymers; and any mixture or any blend thereof.

The negatively and positively charged groups may be positioned on the polymer backbone and/or on pendant side chains of the polymer. The polymers may be aromatic and/or aliphatic in nature. Copolymers and/or mixtures and/or blends of the above polymers can be used.

The nanofibers according to the invention can be made by different conventional techniques such as drawing, template synthesis, self-assembly, phase separation and electrospinning. In one embodiment, the nanofibers are electrospun nanofibers which are made by electrospinning. Electrospinning a polymer solution to fabricate the nanofibers is well known in the art and will not be elaborated herein.

The microfibers according to the invention can be made by different conventional techniques such as wet laid process, spunbonding and melt-blowing. In one embodiment, the microfibers are spunbonded microfibers which are made by spunbonding. Again, spunbonding a polymer to fabricate the microfibers is well known in the art and will not be elaborated herein.

After the microfibers and nanofibers are prepared and available, they are ready to fabricate the layered fibrous membrane of the invention. In one embodiment, the nanofibers can be deposited onto the microfibers by free surface electrospinning to form a layered structure. Adhesives can be applied to the microfibers before depositing the nanofibers onto the microfiber layer in order to enhance the attachment of the nanofibers to the microfibers. The layered fiber structure is then subject to a reaction where the microfibers and the nanofibers are functionalized to carry the functional groups, respectively, leading to formation of the functional fibrous membrane of the invention.

The procedure for manufacturing the microfibers and nanofibers and fabricating the fibrous membrane will be described hereinbelow.

Figure 2:
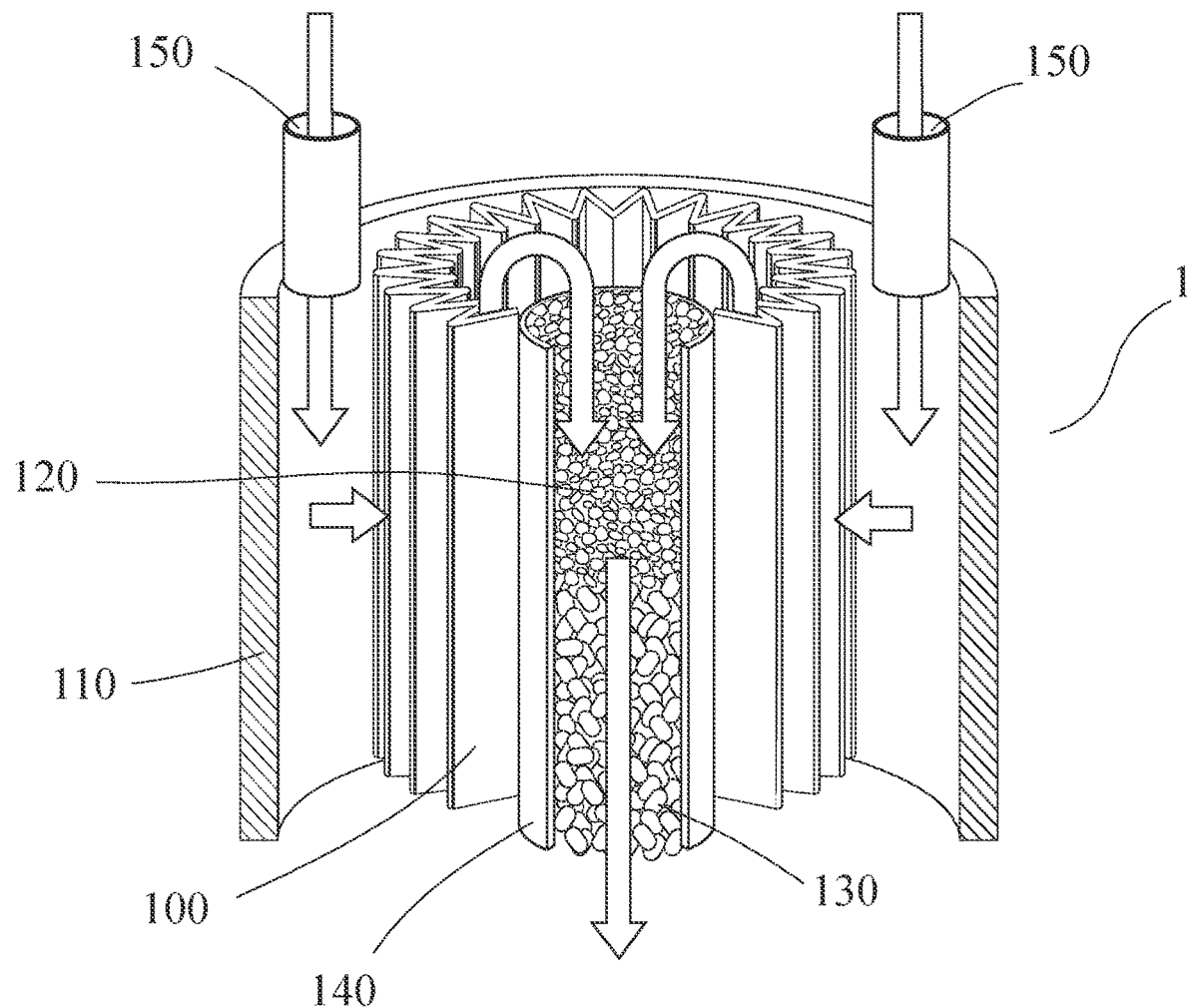
FIG. 2 is a schematic diagram illustrating a filter used in a portable water filtration system which comprises the fibrous membrane of FIG. 1, porous resin beads and activated carbon, wherein a front portion of the casing, and a front portion of the membrane, and a front portion of the cartridge are removed for illustrative purpose.
Figure 3:
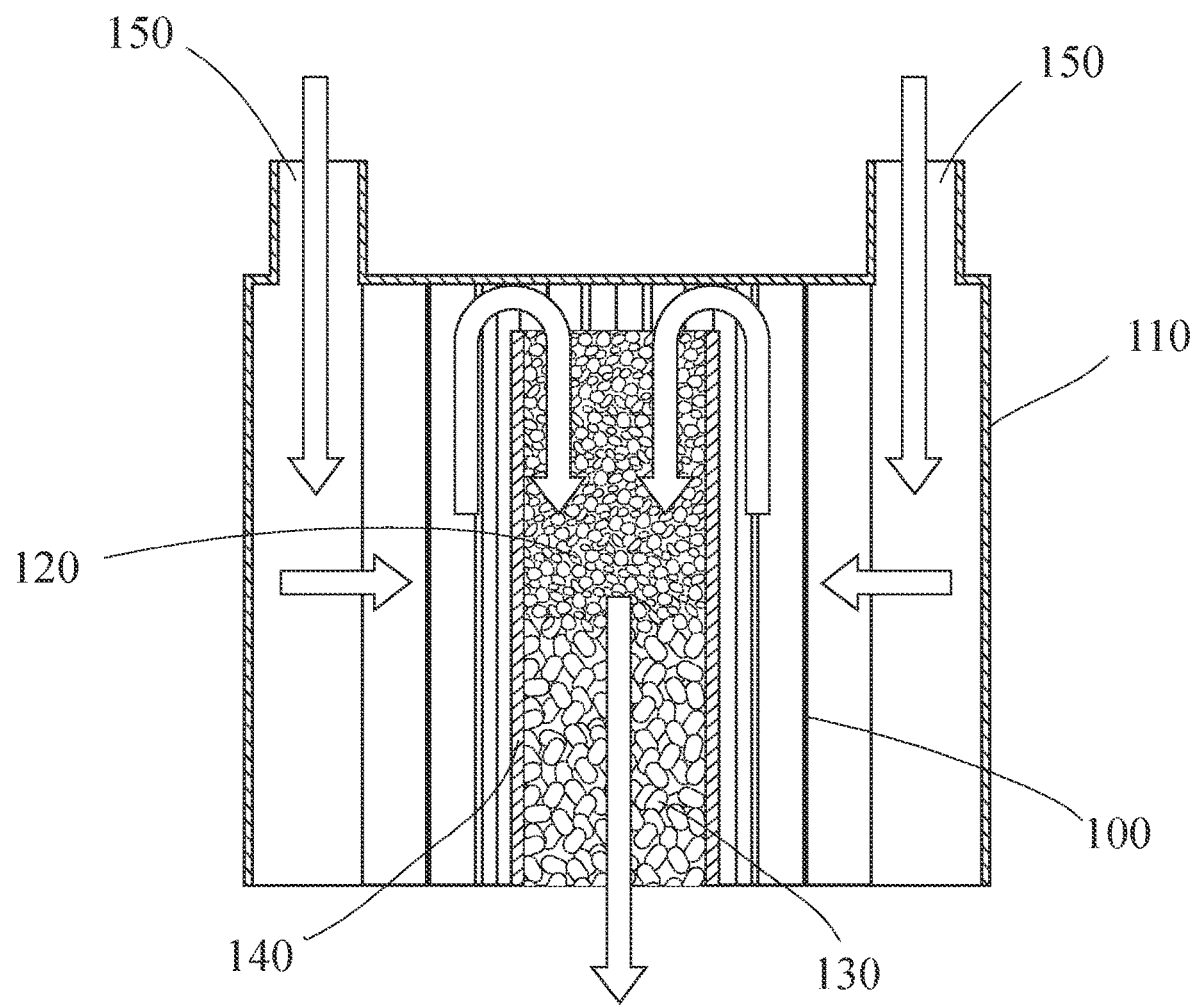
FIG. 3 is a cross-sectional view of the filter of FIG. 2.

Now turning to the figures, a schematic diagram of the structure of a fibrous membrane having an excellent filtration efficiency constructed in accordance with an embodiment of the invention is illustrated in FIG. 1. It should be noted that FIGS. 1 to 3 are prepared schematically and out of scale.

As an exemplary fibrous membrane of the invention, the fibrous membrane 100 shown in FIG. 1 comprises a substrate layer 10 and a filtration material layer 20 attached onto the substrate layer 10 by a deposition method. The substrate layer 10 consists of the microfibers only and is used to support the nanofibers. The filtration material layer 20 consists of the nanofibers only and is used to filter out various small-sized particulates without significantly reducing the water flux. The microfibers formed in the substrate layer 10 and the nanofibers formed in the filtration material layer 20 may be functionalized using the same amphoteric polymer as a starting material, e.g. hydrolysate having amide groups of polyacrylonitrile (PAN). Specifically, PAN is reacted to afford a first compound hydrolyzed PAN (H-PAN) comprising negatively charged carboxyl groups and a second compound quaternized amine-terminated PAN comprising positively charged quaternary amino groups. In this embodiment, the microfibers are functionalized with H-PAN to carry the negatively charged carboxyl groups, and the nanofibers are functionalized with quaternized amine-terminated PAN to carry the positively charged quaternary amino groups.

One inventive feature of the fibrous membrane 100 is that the microfibers in the substrate layer 10 comprising carboxyl groups are able to remove heavy metals by ion exchange and adsorption, and the nanofibers in the filtration material layer 20 comprising amino groups are able to remove bacteria and viruses by ion exchange and adsorption.

The invention is also characterized in that the same amphoteric polymer or the same ampholyte is selected to simultaneously produce the negative and positive functional groups which are used to functionalize the microfibers and nanofibers such that they carry negatively charged and/or positively charged functional groups. This significantly simplifies the process of functionalizing the microfibers and nanofibers to carry the charged functional groups.

The fibrous membrane 100 exhibits excellent properties such as notable filterability, permeability and adsorption, and thus may function as a good filter medium of the filter. In addition, the fibrous membrane 100 is pleatable, thereby to increase the filtration area which used in the filter.

The substrate layer discussed above consists of microfibers only, it is possible for the substrate layer to comprise a mixture of microfibers and nanofibers in a ratio which is about 8.5-9.5:0.5-1.5, preferably 9:1. The filtration material layer discussed above consists of nanofibers only, it is possible for the filtration material layer to comprise a mixture of microfibers and nanofibers in a ratio which is about 0.5-1.5:8.5-9.5, preferably 1:9.

FIGS. 2 and 3 illustrate a filter 1 comprising the fibrous membrane 100 as a filter medium. This filter 1 is adapted for a portable and home water filtration system, for example used in a drinking bottle. As illustrated, the filter 1 comprises a cylindrical casing 110, and the membrane 100 which is pleated and arranged coaxially within the cylindrical casing 110 in a spaced-apart fashion in such a manner that the substrate layer 10 of microfibers faces towards the casing 110 and the filtration material layer 20 of nanofibers faces away from the casing 110. Both ends of the fibrous membrane 100 are glued on top and bottom surfaces of the casing 110.

The filter 1 further comprises a plurality of porous resin beads 120 and a plurality of activated carbon particles 130 which are applied to a separate cartridge 140. As shown in this embodiment, the porous resin beads 120 are placed on the activated carbon particles 130. The porous resin beads 120 and the activated carbon particles 130 may be selected from conventional ones known in the art. The cartridge 140 is mounted within a space surrounded by the pleated fibrous membrane 100. The top open end of the cartridge 140 is slightly below the top circumferential edge of the fibrous membrane 100 in order for the water that penetrates the fibrous membrane 100 to flow into the cartridge 140 through this top open end, as indicated by arrows in FIG. 2 representing the water flow direction.

In this embodiment, the water flows into the space defined between the casing 110 and the pleated fibrous membrane 100 through two water inlets 150 mounted atop the filter 1 on two opposite sides thereof, and then passes through the fibrous membrane 100. Because the fibrous membrane 100 carries both positively charged and negatively charged functional groups on the microfibers and the nanofibers, bacterial present in the water can be removed or reduced by size exclusion, while viruses and heavy metals present in the water can be removed or reduced by adsorption and ion exchange, in addition to the membrane filtration to filter out particulate matters. Then, the water coming from the fibrous membrane 100 flows into the cartridge 140 through the top open end of the cartridge 140 and goes down through the porous resin beads 120 and the activated carbon particles 130 placed within the cartridge 140, where chlorine, the remaining heavy metals and other contaminants are further removed or reduced by adsorption and ion exchange.

Therefore, the filter 1 is able to achieve the comprehensive depth filtration based on an arrangement of the inventive fibrous membrane 100, the porous resin beads 120 and the activated carbon particles 130, which arrangement provides the combined effects of adsorption, ion exchange, size exclusion, membrane filtration and the like. With the use of the functional fibrous membrane of the present invention as a pre-filer, the packing density of the porous resin beads 120 and the activated carbon particles 130 can be significantly reduced. Therefore, the filter 1 has both higher filtration capacity and higher filtration efficiency while maintaining the high water flux. In contrast to the filter 1 of the invention, conventional filters contain porous resin beads and activated carbons which shall be densely packed in order to achieve reliable performance, but the cumbersome packing arrangements unavoidably reduce the water flux.

The cylindrical filter is preferred for home and portable water filtration systems, for example useful in drinking bottles. However, it would be appreciated that the filter comprising the fibrous membrane of the invention may be configured in other shapes. For example, a racetrack shape is preferred for pitcher filters.

Additionally, other configurations are possible for the filter comprising the fibrous membrane of the invention. For example, the filter may comprise an array of multiple tubular fibrous membranes as the pre-filter prior to the porous resin beads and activated carbons, such that the water flows along a flowing path of the fibrous membrane array, the porous resin beads and then the activated carbon particles. Another example of the fibrous membrane is of a flat configuration mounted in a cylindrical filter, in which the fibrous membrane is provided as a flat sheet, and mounted onto the bottom of the cylindrical casing, while the porous resin beads and the activated carbon particles are placed above or on the flat fibrous membrane. In this way, the water flows along a flowing path of the porous resin beads, the activated carbon particles and then the flat fibrous membrane.

The method for manufacturing the functional microfibers and nanofibers used to fabricate the fibrous membrane of the invention is described below, which relates to the process for obtaining the functional groups from an amine-based polymer according to the hereinafter described scheme 1.

According to the invention, the microfibers and nanofibers are respectively prepared, for example, by conventional methods described above. The nanofibers are attached to the microfibers (e.g. coated by deposition) to form a layered structure of fibrous membrane. The fibrous membrane is then functionalized according to scheme 1.

Scheme 1

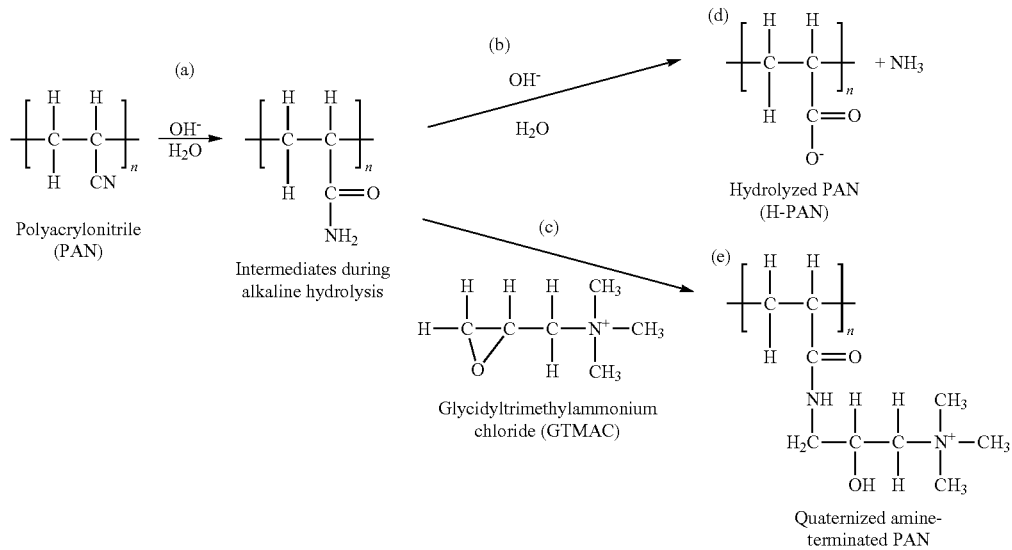

Amine-containing intermediates may be prepared according to the synthesis outlined in Scheme 1. In the above scheme, polyacrylonitrile (PAN) is used as the starting material to prepare the amine-containing intermediate, and the functional microfibers and nanofibers can be made through alkaline hydrolysis and quaternization reaction.

Briefly, polyacrylonitrile (PAN) fibers are used to prepare the microfibers and nanofibers, respectively, to fabricate a PAN fibrous membrane comprising the nanofiber layer coated on the microfiber layer. The PAN fibers of the fibrous membrane are hydrolyzed with sodium hydroxide (NaOH) such that the cyanide groups on PAN are converted into the intermediate containing amino groups at the initial stage of alkaline hydrolysis as shown in step (a). As the hydrolysis reaction takes place continuously, a portion of amino groups of the intermediate are further converted into carboxyl groups at the final stage of alkaline hydrolysis as shown in step (b), and the other portion of amino groups of the intermediate are quaternized with glycidyltrimethylammonium chloride (GTMAC) as shown in step (c). Step (b) and step (c) occur simultaneously. Thus, hydrolyzed PAN (H-PAN) (d) and quaternized amine-terminated PAN (e) are obtained at the end of the reactions. The H-PAN (d) comprising carboxyl groups) is able to remove most heavy metals by ion exchange and adsorption, and the quaternized amine-terminated PAN (e) that carries positively charged quaternary amino groups is able to remove most bacteria and viruses by size exclusion, adsorption and ion exchange. The processing window for functionalizing the PAN fibers is established through optimizing various critical parameters such as concentration of NaOH, reaction temperature, reaction duration, concentration of GTMAC and interval of adding GTMAC.

In one specific example, 5 g of PAN fibers are hydrolyzed in 200 mL of 15% sodium hydroxide (NaOH) for about 2 hours at a temperature of 85° C. under atmospheric pressure to afford the amine-containing intermediate. The intermediate continues to undergo the alkaline hydrolysis process for another about 6 hours. During the whole alkaline hydrolysis process, 18 g of glycidyltrimethylammonium chloride (GTMAC) is added in three portions (6 g each) at 2-hour intervals to yield about 5 g of functional fibers including 2.5 g of hydrolyzed PAN (H-PAN) and 2.5 g of quaternized amine-terminated PAN. The functional fibers are collected and rinsed by water for about 2 hours to remove the unreacted GTMAC. The rinsed functional fibers are then dried, for example by hot air, at 80° C. for about 2 hours to afford the desirable products.

Thus, the invention provides a fibrous membrane capable of removing or reducing various contaminants, including those hard-to-remove heavy metals, bacteria and viruses, from the water under the combined effects of various water treatment techniques, in addition to the conventional membrane filtration. The filter comprising the combination of the inventive fibrous membrane and conventional filtration materials such as porous resin beads and activated carbon particles exhibits the performance superior to the prior art filters.

While the embodiments described herein are intended as exemplary fibrous membrane and its production as well as the filter comprising the fibrous membrane, it will be appreciated by those skilled in the art that the present invention is not limited to the embodiments illustrated. Those skilled in the art will envision many other possible variations and modifications by means of the skilled person's common knowledge without departing from the scope of the invention, however, such variations and modifications should fall into the scope of this invention.

What is claimed is:
1. A fibrous membrane comprising:
at least one single substrate layer comprising at least 80% by weight of microfibers, said single substrate layer carrying both positively charged and negatively charged functional groups, and
at least one layer of filtration material attached to the substrate layer, wherein the layer of filtration material comprises at least 80% by weight of nanofibers wherein said nanofibers are amine-based polymer selected from polyacrylonitrile (PAN) or chitosan, and are functionalized to carry negatively charged and positively charged functional groups within the layer of filtration material after said polymer reacting, respectively, with an alkylating agent and quaternary ammonium compound.

2. The fibrous membrane of claim 1, wherein the at least one single substrate layer comprises at least 90% by weight of the microfibers that carry positively charged and negatively charged functional groups, or consists of the microfibers that carry positively charged and negatively charged functional groups.

3. The fibrous membrane of claim 1, wherein the filtration material layer comprises at least 90% by weight of the nanofibers that carry negatively charged and positively charged functional groups, or consists of the nanofibers that carry negatively charged and positively charged functional groups.

4. The fibrous membrane of claim 1, wherein the positively charged functional groups are selected from the group consisting of quaternary ammonium, phosphonium, sulfonium, amidinium, guanidinium, pyridinium groups, and any combination thereof.

5. The fibrous membrane of claim 1, wherein the negatively charged functional groups are selected from the group consisting of carboxylate, phenol, phosphonate, phosphate, sulfonate, sulfate, sulfamate, nitrate, nitro groups and any combination thereof.

6. The fibrous membrane of claim 1, wherein the negatively charged functional groups are selected from ionisable polysulphonates, salts of poly(2-acrylamido-2-methyl-propane sulphonic acid) or its copolymers with acrylamides or alkyl methacrylates, sulphonated polystyrene, sulphonated polyepichlorohydrin, sulphonated poly(2,5-dimethylphenylene oxide), sulphonated polyphenylether sulphones (or ketones), and sulphonated polyethylene; polyvinylsulphonic acid sodium salt, polyacrylic acid, polymaleic acid, sulphonated EPDM; polycarboxylates, salts of polyacrylic acid and copolymers of acrylic acid; phosphonated polymers; and any mixture or any blend thereof.

7. The fibrous membrane of claim 1, wherein the positively charged and negatively charged functional groups of the substrate layer and the negatively charged and positively charged functional groups of the layer of filtration material are derived from amphions, preferably amine-based groups.

8. The fibrous membrane of claim 1, comprising alternately at least one substrate layer and at least one filtration material layer.

9. The fibrous membrane of claim 1, comprising two or more substrate layers of different pore sizes which decrease in a direction from the substrate layers to the filtration material layers.

10. The fibrous membrane of claim 1, comprising two or more filtration material layers of different pore sizes which decrease in a direction from the substrate layers to the filtration material layers.

11. The fibrous membrane of claim 1, wherein the microfibers or the nanofibers are functionalized to carry the positively and negatively charged functional groups by one of the following:
  reacting a polymer having one or more amino functional groups with an alkylating agent,
  reacting a polymer having one or more amino or hydroxy groups with a quaternary ammonium compound having an epoxy or chlorohydrin group; and
  reacting a polymer having an abstractable hydrogen atom with diallyldimethylammonium chloride in the presence of a radical starter.

12. A filter comprising the fibrous membrane of claim 1 used as a filter medium of the filter.

13. The filter of claim 12, wherein the fibrous membrane is formed as a cylindrical structure and the filter further comprises a casing coaxially surrounding the cylindrical fibrous membrane, and a further filtration material comprising porous resin beads and activated carbon particles which are arranged within a space defined by the cylindrical fibrous membrane.

14. The filter of claim 12, further comprising a cylindrical casing and a further filtration material comprising porous resin beads and activated carbon particles, wherein the fibrous membrane is placed onto a bottom of the cylindrical casing, and the porous resin beads and activated carbon particles are placed on the fibrous membrane.

15. A method for manufacturing the functional microfibers and/or nanofibers used to fabricate the fibrous membrane of claim 1, comprising the steps of:
  (i) providing amine-based polymer microfibers or nanofibers, and
  (ii) reacting the amine-based polymer microfibers and/or nanofibers with an alkylating agent or a quaternary ammonium compound under such a condition that a first portion of the amine-based polymer is converted into a first compound having carboxyl groups, and a second portion of the amine-based polymer is reacted with the alkylating agent or with the quaternary ammonium compound to give a second compound having amino groups, so that the microfibers and/or nanofibers are functionalized to carry negatively charged and/or positively charged functional groups.

16. The method of claim 15, wherein the amine-based polymer is selected from polyacrylonitrile (PAN) or chitosan.

17. The method of claim 15, wherein the alkylating agent is selected from the group consisting of dimethylsulfate, diethylsulfate, dimethylcarbonate, methyl chloride, methyl bromide or benzyl chloride, and any combination thereof.

18. The method of claim 15, wherein the quaternary ammonium compound is selected from the group consisting of trimethyl-1-(2,3-epoxypropyl) ammonium chloride, trimethyl-1-(3-chloro-2-hydroxypropyl) ammonium chloride, glycidyltrimethylammonium chloride (GTMAC), and any combination thereof.

19. The method of claim 18, wherein step (i) of providing the polymer microfibers or nanofibers comprises hydrolyzing polyacrylonitrile (PAN) under alkaline conditions into an amine intermediate.

20. The method of claim 19, wherein the amine intermediate is hydrolyzed under alkaline conditions in the presence of glycidyltrimethylammonium chloride (GTMAC) such that a first portion of amino groups are converted into carboxyl groups and a second portion of amino groups are quaternized with GTMAC, thereby to simultaneously give hydrolyzed PAN (H-PAN) having the carboxyl groups and quaternized amine-terminated PAN having the amino groups.

21. The method of claim 20, wherein PAN and GTMAC are provided in a ratio ranging from 1:4 to 1:3.

22. The method of claim 15, wherein in step (i), the polymer nanofibers are prepared by electrospinning the polymer.

23. The method of claim 15, wherein in step (i), the microfibers are prepared by spunbonding the polymer.

24. The method of claim 15, comprising a step of attaching the functional nanofibers onto the microfibers to form a layered fiber structure prior to step (ii).

* * * * *